(12) United States Patent
Favache et al.

(10) Patent No.: US 7,846,052 B2
(45) Date of Patent: Dec. 7, 2010

(54) SELF-PROPELLED AGRICULTURAL HARVESTING MACHINE HAVING TWO INTERNAL COMBUSTION ENGINES

(75) Inventors: Serge Favache, Homburg (DE); Stefan Bohrer, St. Wendel (DE); Helmut Weis, Maβweiler (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/512,192

(22) Filed: Jul. 30, 2009

(65) Prior Publication Data
US 2010/0186362 A1    Jul. 29, 2010

(51) Int. Cl.
*F16H 47/04*    (2006.01)
(52) U.S. Cl. .......................................... 475/72
(58) Field of Classification Search ............... 475/72, 475/80, 151, 76, 79, 153, 267, 73; 180/165, 180/179, 53.1, 306; 74/720, 606 R; 60/416, 60/405, 487; 56/13.5
See application file for complete search history.

(56) References Cited

U.S. PATENT DOCUMENTS

| | | | | |
|---|---|---|---|---|
| 4,313,351 A | * | 2/1982 | Hagin | 475/80 |
| 4,446,756 A | * | 5/1984 | Hagin et al. | 475/75 |
| 4,731,997 A | * | 3/1988 | Hagin | 60/416 |
| 4,843,907 A | * | 7/1989 | Hagin et al. | 475/80 |
| 4,976,665 A | * | 12/1990 | Hagin et al. | 475/80 |
| 4,983,149 A | * | 1/1991 | Kita | 475/76 |
| 5,052,987 A | * | 10/1991 | Hagin et al. | 475/82 |
| 5,518,461 A | * | 5/1996 | Pfordt | 475/72 |
| 5,766,107 A | * | 6/1998 | Englisch | 475/80 |
| 5,785,623 A | * | 7/1998 | Iino et al. | 475/72 |
| 7,335,125 B2 | * | 2/2008 | McCrary | 475/72 |
| 7,717,816 B2 | * | 5/2010 | Hiraki et al. | 475/5 |

FOREIGN PATENT DOCUMENTS

| | | |
|---|---|---|
| DE | 3722367 | 2/1988 |
| DE | 42 10 258 | 9/1993 |
| DE | 102007019661 | 11/2008 |
| EP | 1640201 | 9/2005 |
| EP | 1813459 | 11/2006 |
| GB | 2195734 A * | 4/1988 |
| SU | 1039744 | 9/1983 |
| SU | 1514991 | 10/1989 |
| SU | 1563867 | 5/1990 |

OTHER PUBLICATIONS

Eurasian Search Report, Dec. 3, 2009, 3 Pages.

* cited by examiner

*Primary Examiner*—Árpád Fábián-Kovács

(57) ABSTRACT

A self-propelled harvesting machine is provided that has operating devices to take-up and/or process harvested crop, which can be driven by means of a drive belt, that can be driven by a belt pulley about an axis of rotation extending horizontally and transverse to the forward operating direction of the harvesting machine. Two internal combustion engines are provided on the harvesting machine and each are supported on the frame arranged side by side alongside each other relative to the forward operating direction, with crankshafts extending in the forward operating direction. A connecting gearbox is arranged ahead of the internal combustion engines in the forward direction of operation and is connected or can be connected so as to drive with the first crankshaft, the second crankshaft and the belt pulley. The connecting gearbox includes two angle gearboxes that are connected to a transverse shaft arranged in the transverse direction that is connected or may be connected, in turn, with the belt pulley.

14 Claims, 3 Drawing Sheets

SELF-PROPELLED AGRICULTURAL HARVESTING MACHINE HAVING TWO INTERNAL COMBUSTION ENGINES

FIELD OF THE INVENTION

The invention concerns a self-propelled agricultural harvesting machine, having a frame extending in the forward operating direction. The frame is supported by means of devices in contact with the ground and can be moved in the forward operating direction by means of those operating devices. Operating devices are provided to take up and/or process harvested crop, that can be driven by a belt pulley with a drive axis that is oriented horizontally and transverse to the forward operating direction. A first internal combustion engine is supported on the frame and has a first crankshaft, a second internal combustion engine is supported on the frame and has a second crankshaft. A connecting gearbox is arranged ahead of the internal combustion engine in the forward operating direction, that is or may be connected so as to drive the first crankshaft, the second crankshaft and the belt pulley. The two internal combustion engines are arranged side by side alongside each other with regard to the forward operating direction.

BACKGROUND OF THE INVENTION

In the recent past self-propelled agricultural harvesting machines are known that are equipped with constantly stronger internal combustion engines that, at the present time, can deliver more that 800 KW. Due to the relative low production quantity in which such high powered engines are produced, these engines are relatively more costly in each case than two internal combustion engines with half the power output. Moreover, the entire output of the engine is not always required—therefore it is not necessary for example for transportation on public roads or for the harvest of grass—which leads to a lower efficiency of the engine compared to full power operation, it has therefore been proposed (EP 1 640 201 A1) that a harvesting machine be equipped with two internal combustion engines, of which, in addition to the first internal combustion engine, one can be started to meet greater power requirements.

According to EP 1 640 201 A1 the crankshafts of the two internal combustion engines are arranged horizontally and transverse to the forward operating direction, where one internal combustion engine is arranged ahead of the other internal combustion engine in the direction of operation. A spur gear drive establishes a connection between the crankshafts of both internal combustion engines and the main drive-line of the harvesting machine. Between one of the two internal combustion engines and the spur gear gearbox a clutch, that can be disengaged, is arranged in order to be able to drive the harvesting machine with only a single internal combustion engine, without having to let the other internal combustion engine run along with it. Both internal combustion engines are mounted, together with the spur gear gearbox on an auxiliary frame, so that they form a compact arrangement for a group of components that can be preassembled.

Another forage harvester is described by EP 1 813 459 A1. The internal combustion engines are arranged transverse to the forward operating direction and one behind the other. A belt drive gearbox connects the crankshaft of the rear internal combustion engine with the crankshaft of the forward internal combustion engine that in turn drives a drive belt that is connected so as to drive the largest power consumers (chopper drum and blower).

DE 10 2007 019 661 A1 that is seen as forming a class, described an agricultural forage harvester with two internal combustion engines arranged side by side alongside each other, that extend in the direction of operation, whose crankshafts are connected to an angle drive gearbox by articulated shafts and a spur gear gearbox, which drives a drives a belt pulley over a transverse shaft which in turn drives a chopper drum over a main drive belt.

DE 37 22 367 A described an agricultural forage harvester with a single internal combustion engine arranged above the rear axle, whose crankshaft extends to the front in the direction of operation and is connected by an articulated shaft to a bevel gear distribution gearbox, that drives an output shaft extending transverse to the forward operating direction, which in turn brings a chopper drum into rotation over a belt drive. Moreover, the bevel gear distribution gearbox mechanically drives the front wheels of the forage harvester; the drive for the front harvesting attachment and the pre-pressing rolls is derived from the input shaft connected to the articulated shaft of the bevel gear distribution gearbox.

In drive arrangements with internal combustion engines arranged in the transverse direction, as they are described in EP 1 640 201 A and EP 1 813 459 A, it can be seen as detrimental that the possible maximum width of the harvesting machine permits only a limited length of the engines and thereby also limits the maximum possible power output. This disadvantage is avoided with engines arranged in the longitudinal direction (DE 10 2007 019 661 A), in which however the output shaft of the spur gear gearbox that combines the power output of the internal combustion engines is arranged in the longitudinal direction, which is shown to be a disadvantage since a further angular gearbox is required, in order to drive a sideways belt drive for the largest power consumers, which increases the construction cost and the number of gear meshes in the driveline and negatively affect the efficiency.

SUMMARY OF THE INVENTION

The purpose underlying the invention is seen in the need to provide a drive arrangement for a self-propelled harvesting machine with several internal combustion engines arranged in the longitudinal direction, that makes possible the drive of a transverse belt drive for the drive of the larger consumers of the harvesting machine in a simple and effective way with increased efficiency.

A self-propelled agricultural harvesting machine is thus provided that has a frame extending in the forward operating direction that is supported by devices in contact with the ground (as a rule, wheels or rubber tread propulsion drive) and can be moved in the forward operating direction by the aforementioned devices. Moreover, the harvesting machine is provided with operating devices for taking up and processing harvested crop that can be driven by means of a drive belt, and can be driven by a belt pulley with an axis of rotation oriented horizontally and transverse to the forward operating direction. Two internal combustion engines are attached to the frame alongside each other, whose crankshafts extend in the forward operating direction. A connecting gearbox is arranged ahead of the internal combustion engines in the forward operating direction and consists of two angle gearboxes, for example, bevel gear gearboxes, that are connected on the one hand with a crankshaft of the internal combustion engine and on the other hand with a transverse shaft arranged in the transverse direction, that in turn can be or is connected with the belt pulley.

In this way a simple and efficient arrangement of the connecting gearbox can be attained, that in each case requires only two meshing gears, in order to drive the transverse shaft by means of the internal combustion engines and with it the belt pulley.

In a preferred embodiment of the invention there is the possibility, if necessary (that is, at a low power requirement, for example, for operation on public roads or the harvest of grass) to operate only one of the two internal combustion engines and to stop the other one. In order to avoid the other internal combustion engine from running along unnecessarily, the invention proposes that a clutch be provided between the crankshaft of the first or the second internal combustion engine and the transverse shaft that permits a separation from the driveline of the internal combustion engine not required in that particular case. Here it is preferred that each of the internal combustion engines can be stopped and separated from the driveline so that both are subject to a most possibly similar wear. The clutches can be located at any desired location that is at the first internal combustion engine at a greater spacing to the belt pulley on the input side or on the output side of the angle gearbox and the internal combustion engine adjacent to the belt pulley on the input side of the angle gearbox.

The transverse shaft may be provided with a pump assembly in addition to the drive belt, that includes, for example, a fluid power pump for the drive of fluid power motors for the forward propulsion of the harvesting machine, a steering pump, a fluid power pump for the drive of fluid power motors for a front harvesting attachment or a fluid power pump for the oil supply for the control of a hydrostatic drive for the forward propulsion of the harvesting machine. This pump assembly is driven most appropriately by the output side of the aforementioned clutches, for example, from a shaft that is arranged between the first clutch of the first internal combustion engine and the first angle gear box, or from the shaft that is positioned between the second clutch of the second internal combustion engine and the second angle gear box. A drive of the pump assembly derived from the transverse shaft would also be conceivable.

Due to their relatively large mass the internal combustion engines are independently fastened to the frame, as a rule over vibration damping elements. The angle gearboxes and if necessary the clutches arranged between internal combustion engines and the angle gearboxes may be fastened to the associated internal combustion engines. In order to equalize possible tolerances and deviations of the installed position of the internal combustion engines and the angle gearboxes, and in order to avoid a possible transmission of vibrations from one internal combustion engine to the other internal combustion engine, the preferred solution is to insert an articulated shaft into the transverse shaft between the two angle gearboxes. Accordingly the transverse shaft is composed of individual sections, of which in each case, at least one is directly connected to an angle gearbox, where the sections between the angle gearboxes are connected among each other by the articulated shaft. The articulated shaft may be telescoping or invariable in its length.

In order to be able to turn off the drive of the operating devices for taking up or processing harvested crop, for example, during operation on public roads, a solution is to provide a third clutch between the transverse shaft and the belt pulley. The third clutch may be located on the side of the belt pulley facing the angle gearboxes between belt pulley and the transverse shaft, or a section of the transverse shaft may extend through a hollow shaft connected to the belt pulley to the third clutch, which accordingly is located on the side of the belt pulley facing away from the angle gearboxes. Then the hollow shaft drives the belt pulley from the clutch and preferably also drives the driveline of a fluid power pump for the drive of an intake conveyor and/or a front harvesting attachment of a harvesting machine.

BRIEF DESCRIPTION OF THE DRAWINGS

The embodiments of the invention are described below with reference to the accompanying drawings wherein.

DESCRIPTION OF THE PREFERRED EMBODIMENT

Figure 1:
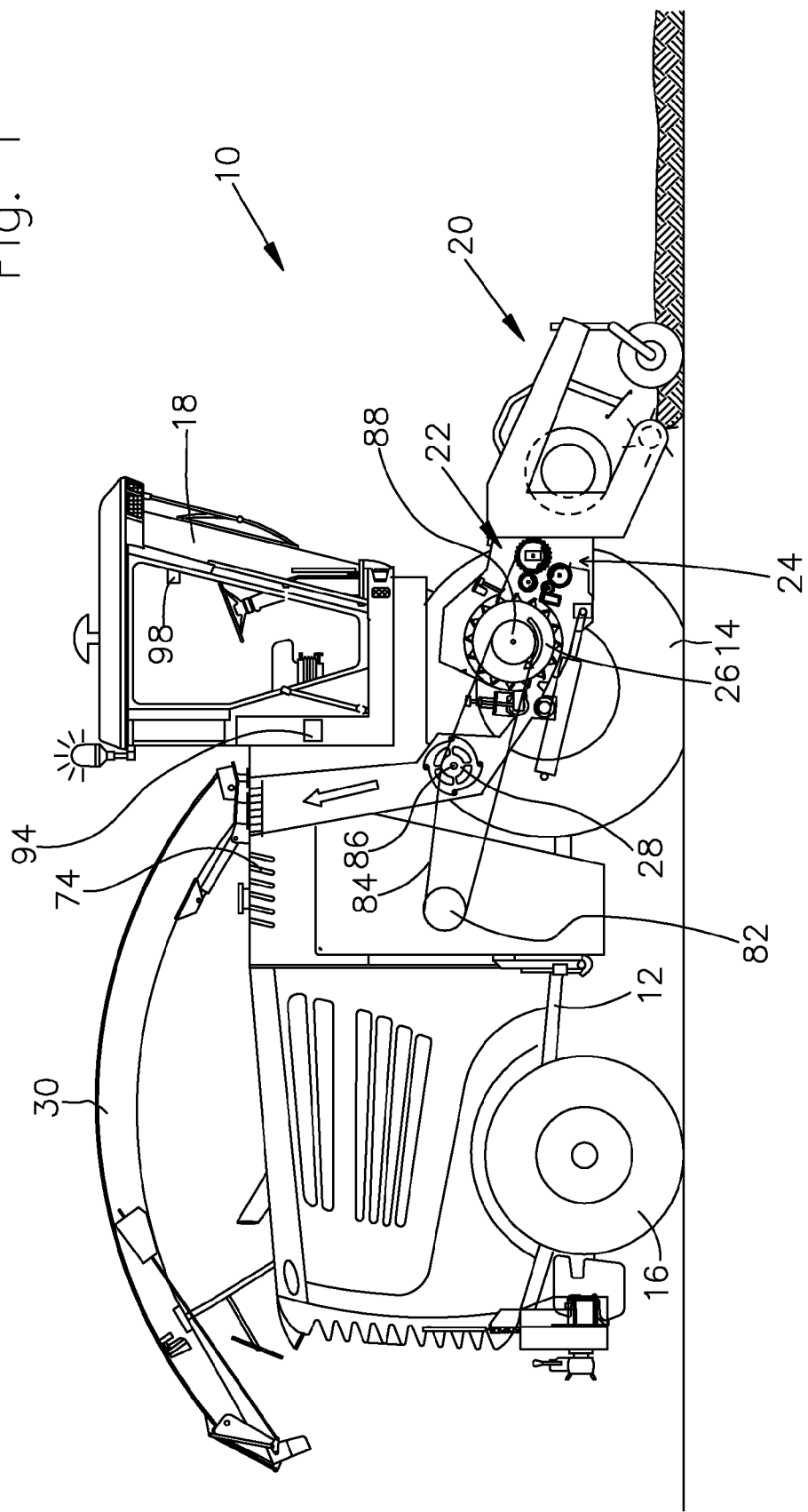
FIG. 1 is a schematic side view of a self-propelled harvesting machine in the form of a forage harvester.

FIG. 1 shows a schematic side view of a harvesting machine 10 in the form of a self-propelled forage harvester. The harvesting machine 10 is built upon a frame 12 that is carried by front driven wheels 14 and steerable rear wheels 16. The harvesting machine 10 is controlled from an operator's cab 18, from which a front harvesting attachment 20 in the form of a take-up can be controlled visually. Harvested crop taken up from the ground by means of the front harvesting attachment 20, for example, grass or the like, is conducted over an intake conveyor 22 with pre-pressing rolls, that are arranged within an in-take housing 24 on the front side of the forage harvester 10, and conducted to the chopper drum 26 arranged underneath the operator's cab 18, which chops it into small pieces and delivers it to a conveyor arrangement 28. The harvested crop leaves the harvesting machine 10 to a transport vehicle operating adjacent to it over an output duct 30 that can rotate about an approximately vertical axis and that can be adjusted in inclination. In the following the directions, such as to the side, down and up refer to the forward operating direction V of the harvesting machine 10 that extends to the right in FIG. 1.

Figure 2:
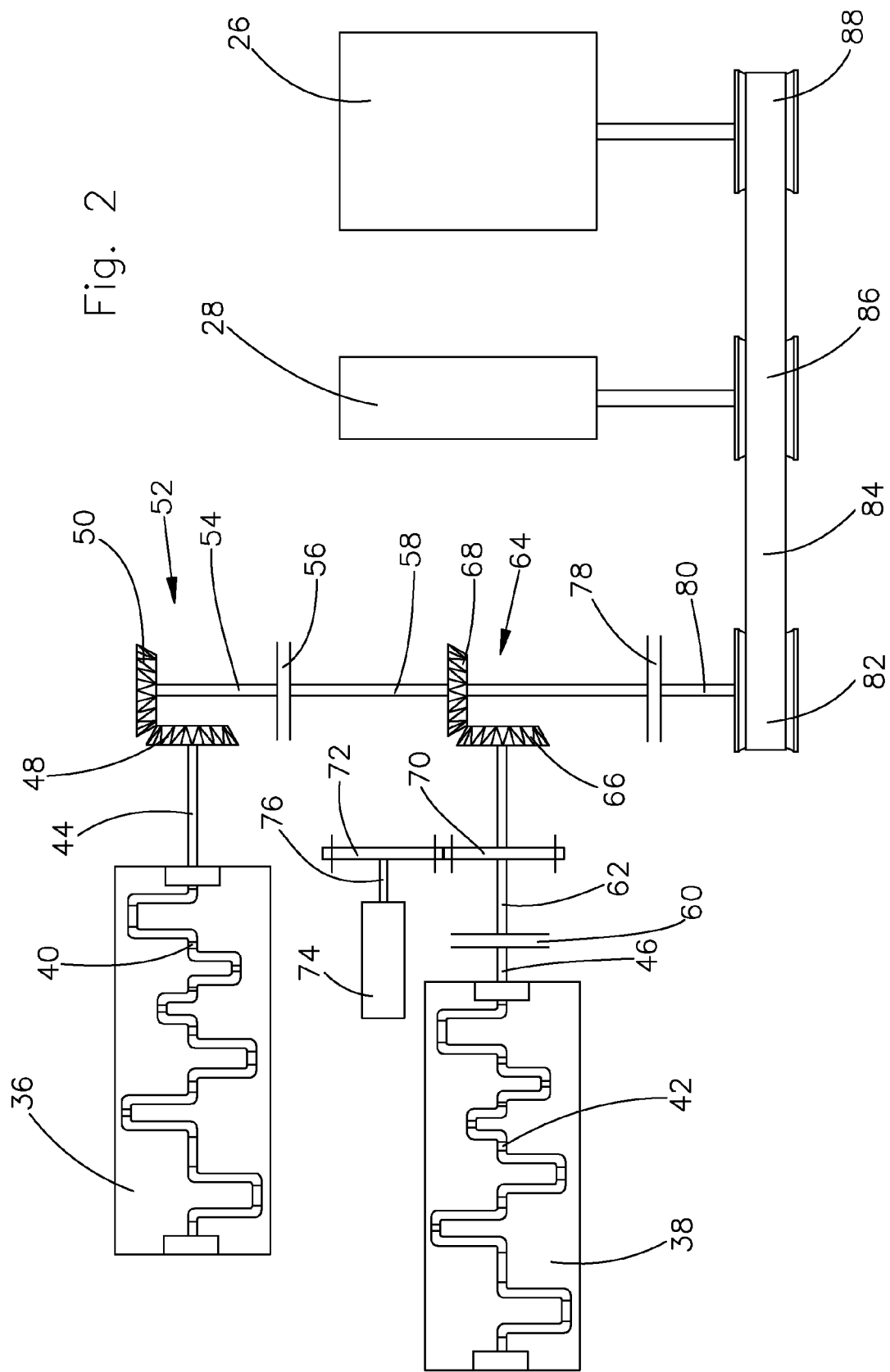
FIG. 2 is a schematic plan view of a first embodiment of the drive arrangement of a harvesting machine; and, FIG. 3 is a plan view of a second embodiment of the drive arrangement of a harvesting machine.

FIG. 2 shows a plan view of the drive arrangement of the harvesting machine 10. In the rear area of the harvesting machine 10 two internal combustion engines 36, 38 (first and second), particularly in the form of diesel engines are arranged to the rear of the rear axle and are connected with longitudinal carriers or transverse carrier to the frame 12 and are supported in each case separately on the frame 12, or they are mounted on an auxiliary frame that in turn is fastened to the frame 12. Vibration damping rubber and metal elements may be arranged in each case between the internal combustion engines 36, 38 and the frame 12 or the auxiliary frame. The power output of each of the internal combustion engines 36, 38 are preferably identical, although internal combustion engines 36, 38 of different power output could be used. The internal combustion engines 36, 38 extend in the forward operating direction of the harvesting machine 10 to approximately the rear end of the frame 12 and include (first and second) crankshafts 40, 42 that extend at the front out of the housing of the internal combustion engines 36, 38. The crankshafts 40, 42 each drive a (first and second) longitudinal shaft 44, 46 that extend horizontally and in the forward operating direction.

The first longitudinal shaft 44 is connected at its front end to a first angle gearbox 52 that is composed of a first bevel gear 48 that is directly connected to the longitudinal shaft 44 and a second bevel gear 50 that meshes with the first bevel gear 48. The axis of rotation of the second bevel gear 50 extends horizontally and transverse to the forward operating direction. The second bevel gear 50 is connected to a section 54 of a first transverse shaft 54, 58, 80, that in turn is connected to a first clutch 56 that is connected at its output side with a second section 58 of the transverse shaft 54, 58, 80.

At its forward end the second longitudinal shaft 46 is connected to a second clutch 60 whose output side is connected to a third output shaft 62 that extends coaxially to the longitudinal shaft 46. The longitudinal shaft 62 is connected at its front end with a second angle gear box 64 that is composed of a first bevel gear 66 that is connected directly with the third longitudinal shaft 62 and a second bevel gear 68 that meshes with the first bevel gear 66. The axis of rotation of the second bevel gear 68 extends horizontally and transverse to the forward operating direction and the second bevel gear 68 is rigidly connected to the second section 58 of the transverse shaft 54, 58, 80.

The third longitudinal shaft 62 also carries a gear 70 with teeth around its circumference between the second clutch 60 and the first bevel gear 66 of the second angle gearbox 64, it also meshes with a further gear 72, which drives a pump assembly 74 over a fifth longitudinal shaft 76, which drives a fluid power pump for the drive of fluid power motors for the forward propulsion of the harvesting machine, a steering pump, a fluid power pump for the drive of fluid power motors for the front harvesting attachment 22, and a fluid power pump for the oil supply for the control of the hydrostatic drive for the forward propulsion of the harvesting machine 10.

The second section 58 of the transverse shaft 54, 58, 80 is connected to a third clutch 78 at its end that is spaced away from the first clutch 56, which drives a belt pulley 82 over a third section 80 of the transverse shaft 54, 58, 80. The belt pulley 82 is surrounded by the drive belt 84 that is also slung around a belt pulley 86 for the drive of the conveyor arrangement 28 and a belt pulley 88 for the drive of the chopper drum 26. In place of the third clutch 78 or in addition to it, the drive of the chopper drum 26 and of the conveyor arrangement 28 can be put into motion or stopped by a mechanism for the tensioning or release of the drive belt 84.

After all that, the angle gearboxes 52, 64 provide a simply configured and efficient connecting gearbox, by means of this the internal combustion engines 36 and/or 38 can drive the belt pulley 82. In place of the bevel gears 48, 40, 66, 68 worm gears could also be used along with meshing gears, which also goes for the second embodiment.

Figure 3:
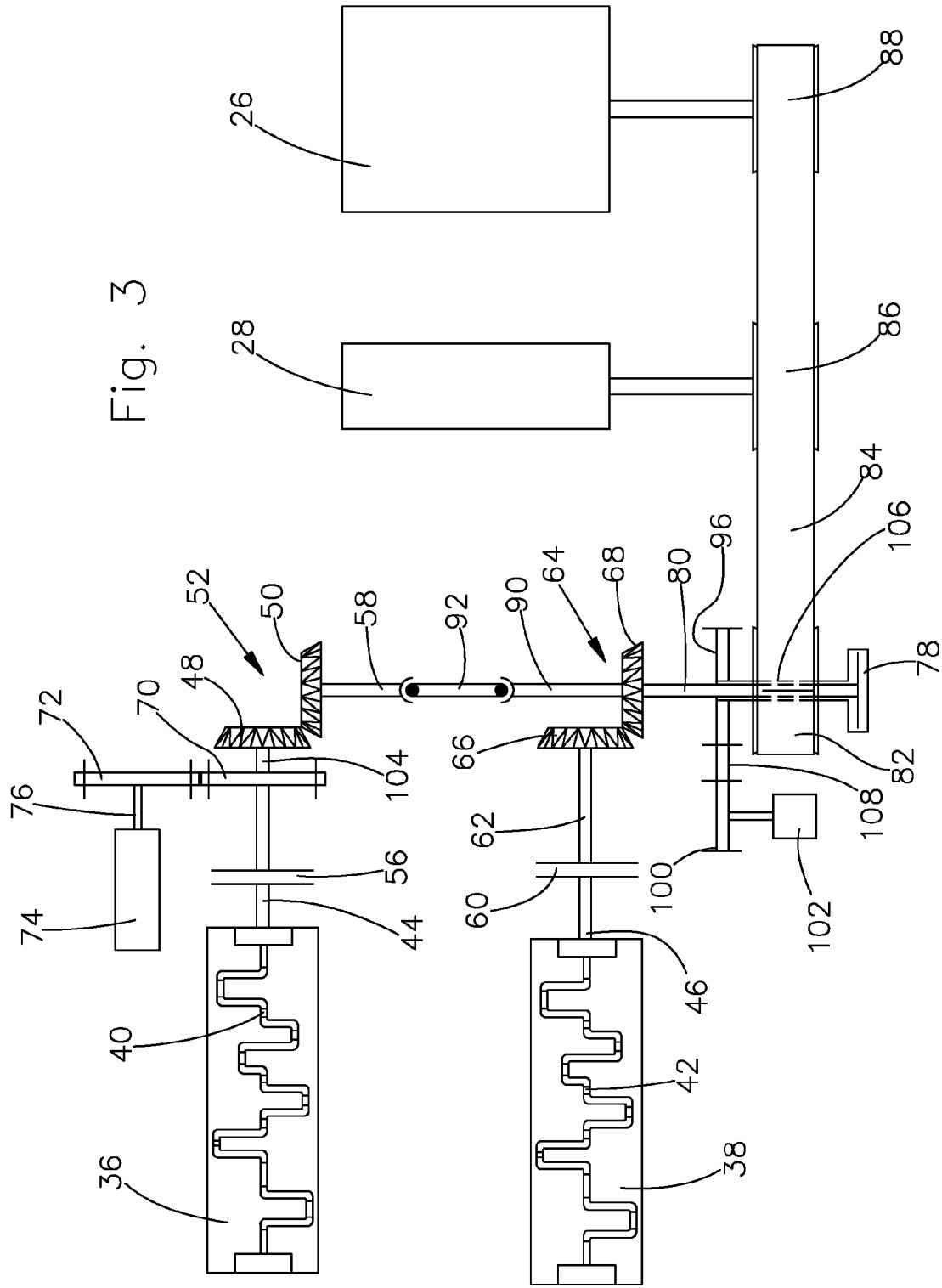

In the second embodiment of the driveline of the harvesting machine 10, shown in FIG. 3, elements that coincide with the first embodiment are identified by the same part number call-outs. In this second embodiment the internal combustion engines 36, 38 are arranged in the forward operation direction alongside each other, which obviously would also be possible with the first embodiment. The first internal combustion engine 36 drives, during the operation, with its crankshaft 40 the first longitudinal shaft 44 that is connected with the input side of the first clutch 56. The output side of the first clutch 56 is connected over a fourth longitudinal shaft 104 with the first bevel gear 48 of the first angle gearbox 52. The fourth longitudinal shaft 104 also drives the pump assembly 74 over the gears 70, 72 and the fifth longitudinal shaft 76. It would also be conceivable to drive over one of the gears 70, 72 or a gear arranged between these (not shown) further permanently connected components, such as an electric generator and/or a blower drive for the supply of cooling air to the internal combustion engines 36, 38.

The second bevel gear 50 of the first angle gearbox 52 is connected with a first section 58 of the transverse shaft 58, 80, 90, that in turn is connected over an articulated shaft 92 to a second section 90 of the transverse shaft 58, 80, 90, which extends to the second bevel gear 68 of the second angle gearbox 64. During operation the second internal combustion engine 38 drives the second longitudinal shaft 46 with its crankshaft 42, which is connected to the input side of the second clutch 60. The output side of the second clutch 60 is connected over the third longitudinal shaft 62 with the first bevel gear 66 of the second angle gearbox 64.

The internal combustion engines 36, 38 are fastened separately from each other to the frame 12 or an auxiliary frame, as a rule over damping elements. The associated clutches 56 or 60 and angle gearboxes 52, 64 are also fastened to their housings. The articulated shaft 92 permits the equalization of possible tolerances of the positions of the internal combustion engines 36, 38 and the angle gearboxes 52, 64.

The second section 90 of the transverse shaft 58, 80, 90 and the second bevel gear 68 of the second angle gearbox 64 are connected with an outer section 80 of the transverse shaft 58, 80, 90, that extends through a hollow shaft 106 connected to a belt pulley 82 on the side of the belt pulley 82 facing away from the angle gearboxes 52, 64 and is connected there with a third clutch 78. The third clutch 78 is connected on its output side to the hollow shaft 106, that also drives a fluid power pump 102 over gears 96, 108 and 100 on the side of the belt pulley 82 facing the angle gearboxes 52, 64, that is used for the drive of a fluid power motor (not shown) for the drive of the intake conveyor 22.

The third clutch 78 makes it possible to turn on and off the drive belt 84 and with it the chopper drum 26 and the conveying arrangement 28. The gears 96, 108 and 100 can be arranged within a housing that is fastened to the housing of the second angle gearbox 64. On the other hand the gears 70 and 72 are preferably integrated within the housing of the first angle gearbox 52 and the first clutch 56.

An appropriate control arrangement 94 (see FIG. 1) is used in both embodiments for switching on and separating the internal combustion engines 36, 38 from the driveline. The control arrangement 94 is connected with the clutches 56, 60 and 78 and with engine controls (not shown) of the internal combustion engines 36 and 38. In addition to the stopping of the internal combustion engines 36, 38 three modes of operation are possible. With larger power requirements, for example, for the harvest of corn with a front mowing attachment (not shown) in place of the take-up 20, both internal combustion engines 36, 38 are running and the clutches 56 and 60 are engaged. The third clutch 78 is used in a manner known in itself so as to turn the conveying arrangement 28 and the chopper drum 26 on and off, if required, for which purpose an appropriate interface 98 (for example, a switch) is connected to the control arrangement 94. At lower power requirements, for example, during the harvest of a swath by means of the take-up 20 shown in FIG. 1, or during operation on public roads, or during the harvest of corn if only single rows of corn at the edge of a field are to be harvested, only one of the internal combustion engines 36 or 38 is required, while the other internal combustion engine 38 or 36 is stopped. The clutch 60 or 56 that is associated with the internal combustion engine 38 or 36 that is not used at that time is then disengaged, while the other clutch 56 or 60 is engaged and also drives the pump assembly 74. If later both internal combustion engines 36 and 38 are again required, the stopped internal combustion engine 38 or 36 is started and brought up to the rotational speed of the running internal combustion engine 36 or 38 and the associated clutch 60 or 56 is engaged. It would also be possible to engage the associated clutch 60 or 56 in order to start the stopped internal combustion engine 38 or 36.

The engaging or disengaging of an internal combustion engine 36 or 38 to or from the driveline can be performed by an input from the operator by means of the interface 98 or automatically by the control arrangement 94, for example, based upon the internal combustion engine 36 and/or 38 taking up the load (for example, on the basis of its rotational speed) or on the basis of a torque sensor in the driveline. It would also be conceivable that one of the internal combustion engines 36, 38 be stopped automatically if an operation on public roads vs. field operations switch of the interface 98 is in the public roads operating position, and to turn it into the field operating position automatically if the public roads vs. field operations switch is in the field operating position and an automatic recognition of the front harvesting attachment (se EP 0 377 163 A or DE 199 49 994 A) signals the fact that a front harvesting attachment for corn is mounted, while one of the internal combustion engines 36, 38 always remains stopped when a front harvesting attachment 20 in the form of a take-up (as shown in FIG. 1) is mounted. In the single engine operating mode the control arrangement 94 uses both internal combustion engines 36, 38 alternately in order to keep their wear approximately equal.

Having described the preferred embodiment, it will become apparent that various modifications can be made without departing from the scope of the invention as defined in the accompanying claims.

The invention claimed is:

1. A self-propelled agricultural harvesting machine comprising:
   a frame extending in the forward operating direction, that is supported on devices in contact with the ground, and that can be moved in the forward operating direction by the devices in contact with the ground;
   operating devices to take up and/or process the harvested crop, which can be driven by means of a drive belt, and that can be driven by a belt pulley with an axis of rotation extending horizontally and transverse to the forward operating direction;
   a first internal combustion engine with a first crankshaft supported on the frame;
   a second internal combustion engine with a second crankshaft supported on the frame; and,
   a connecting gearbox arranged ahead of the internal combustion engines connected so as to be driven by the first crankshaft, the second crankshaft and the belt pulley;
   a first clutch; and,
   a second clutch;
   wherein both internal combustion engines are arranged side by side alongside each other relative to the forward operating direction and the crankshafts extend in the forward operating direction, and wherein the connecting gearbox includes a first angle gearbox and a second angle gearbox, that may be connected so as to be driven by in each case one of the crankshafts and a transverse shaft arranged in the transverse direction so as to drive, and that the transverse shaft is connected to the belt pulley.

2. A harvesting machine according to claim 1, wherein the first clutch is arranged between the first crankshaft and the transverse shaft.

3. A harvesting machine according to claim 1, wherein the first clutch is arranged between the first crankshaft and the first angle gearbox.

4. A harvesting machine according to claim 1, wherein the second clutch is arranged between the second crankshaft and the transverse shaft.

5. A harvesting machine according to claim 1, wherein the second clutch is arranged between a second crankshaft and the second angle gearbox.

6. A harvesting machine according to claim 1, wherein a pump assembly is connected so as to drive the output side of at least one of the first and second clutches.

7. A harvesting machine according to claim 6, wherein the pump assembly can be driven by a drive connection, arranged between the first clutch and the first angle gearbox spaced away from the belt pulley.

8. A harvesting machine according to claim 1, wherein the internal combustion engines are fastened to the frame of the harvesting machine independently of each other.

9. A harvesting machine according to claim 1, wherein each of the first and second angle gearboxes is fastened to the internal combustion engine.

10. A harvesting machine according to claim 1, wherein the transverse shaft is composed of several separate sections between the first and second angle gearboxes, so that an articulated shaft can be inserted between the sections of the transverse shaft that is connected with an angle gearbox.

11. A harvesting machine according to claim 1, wherein a third clutch is inserted between the transverse shaft and the belt pulley.

12. A harvesting machine according to claim 11, wherein a fluid power pump is connected to the output side of the third clutch for the drive of an intake conveyor or a front harvesting attachment.

13. A harvesting machine according to claim 12, wherein a section of the transverse shaft extends through the belt pulley, and the third clutch is arranged on the side of the belt pulley facing away from the angle gearboxes and is connected on its output side through a hollow shaft, within which the section of the transverse shaft is located, and connected to the belt pulley and if necessary the driveline of the fluid power pump.

14. A harvesting machine according to claim 1, wherein the first and second angle gearboxes are bevel gearboxes.

* * * * *